United States Patent [19]

Westerman, Jr. et al.

[11] Patent Number: 4,516,301

[45] Date of Patent: May 14, 1985

[54] METHOD AND APPARATUS FOR REMOVING FLASH FROM A MOLDED RECORDED DISC

[75] Inventors: Harry H. Westerman, Jr., Danville; John J. Prusak, Indianapolis, both of Ind.

[73] Assignee: RCA Corporation, Princeton, N.J.

[21] Appl. No.: 439,928

[22] Filed: Nov. 8, 1982

[51] Int. Cl.³ .............................................. B23B 5/00
[52] U.S. Cl. .................... 29/27 C; 29/558; 82/1.1; 82/1 C
[58] Field of Search .......................... 29/27 C, 57, 558; 82/1.1, 1 C; 408/130

[56] References Cited

U.S. PATENT DOCUMENTS

| | | | |
|---|---|---|---|
| 1,885,848 | 11/1932 | March | 82/1.1 X |
| 2,192,598 | 3/1940 | Somers | 82/1.1 |
| 2,586,663 | 2/1952 | Keck et al. | 82/1.1 |
| 2,674,098 | 4/1954 | Taylor | 408/130 X |
| 3,412,427 | 11/1968 | Flusfeder et al. | 18/5.3 |
| 4,326,325 | 4/1982 | Chambers et al. | 29/27 |

FOREIGN PATENT DOCUMENTS 0044608 1/1982 European Pat. Off. .

Primary Examiner—Z. R. Bilinsky
Attorney, Agent, or Firm—Birgit E. Morris; Donald S. Cohen

[57] ABSTRACT

An apparatus for deflashing a molded recorded disc includes a turntable support for the disc and a scissors type knife having a pair of blades pivotally mounted together with one of the blades being mounted on a support which is positioned adjacent the turntable so that a portion of the flash of the disc extends between the blades. A pneumatic cylinder has a piston rod connected to a knife support to selectively move with the support and the knife toward and away from the disc. The blades have cooperating cutting edges for cutting through the flash and one of the blades has a front end cutting surface for removing the flash when the disc is rotated by the turntable. In the operation of the apparatus the knife first removes a major portion of the flash and then the knife is moved slowly inwardly against the edge of the disc to remove additional portions of the flash until the desired diameter of the disc is reached.

15 Claims, 5 Drawing Figures

METHOD AND APPARATUS FOR REMOVING FLASH FROM A MOLDED RECORDED DISC

BACKGROUND OF THE INVENTION

The present invention relates to a method and apparatus for removing flash from a molded recorded disc, and more particularly to a method and apparatus for removing the flash so as to provide the disc with a smooth edge and a controlled diameter.

Recorded discs are flat circular plates of a plastic material having information on one or both surfaces thereof in the form of a surface relief pattern formed along a spiral path. The discs are generally formed in a mold press having a pair of mold plates, at least one of which is movable toward and away from the other and which, when together, form a mold cavity therebetween of the size and shape of the disc. On the opposed surfaces of the plates are stampers which have on their surfaces the negative of the surface relief pattern to be formed in the surfaces of the disc. When a disc is molded in such a mold press, excess plastic material flows radially outwardly beyond the edge of the mold cavity so that the molded disc has excess material around its edge, known as "flash," which must be removed. This removal of the flash is generally achieved by placing the still warm disc directly from the mold press onto a circular support plate so that the flash projects beyond the edge of the plate and rotating the plate. A knife is pressed against the rotating disc so that the knife cuts off the flash up to the edge of the disc. Such an apparatus is shown in U.S. Pat. No. 3,412,427 to J. Flusfeder et al., issued Nov. 26, 1968, entitled "Apparatus For Manufacturing Disc Records."

Recently there has been developed a high density recorded disc made of a plastic material which is filled with large amounts of conductive carbon. This type of disc is more brittle than discs which do not contain the conductive carbon. It has been found that when the flash is removed from this type of disc by means of a knife, the edge of the disc is not smooth. Also, since the disc is more difficult to cut with a knife, it is difficult to accurately control the diameter of the disc after flash removal. Since this type of disc is placed in a carrier or caddy to protect the surface of the disc from dirt and other contaminants, in order to permit the disc to be removed and replaced into the caddy, it is desirable to accurately control the diameter dimensions of the disc. Therefore, it is desirable to have means for removing the flash from the disc which provides the disc with a smooth edge and which will permit accurate control of the diameter of the disc.

A method and apparatus which has been developed to achieve this result includes a knife for removing the major portion of the flash which is referred to as the "bark," and a rotary cutter, such as a router, for making the final cut to the desired dimension of the disc. Such a method and apparatus is described in U.S. Pat. No. 4,326,325 to R. W. Chambers et al., issued Apr. 27, 1982, entitled "Method and Apparatus For Deflashing Molded Recorded Disc." Although this method and apparatus was found to be satisfactory, it does have some problems. The debris that is removed from the rotary cutter is in the form of fine particles. Although the apparatus includes suction means for removing the debris, the micro size particles are difficult to remove and have a tendency to get onto the disc. The particles on the disc can cause surface damage to the disc or clog up the fine dimension grooves in the disc. Also, the use of the rotary cutter requires additional equipment which adds to the expense of the apparatus used to make the disc. In addition, the rotary cutter and its drive motor contain materials, such as oils and lubricant, which can contaminate the disc surface. Finally, the rotary cutter still does not form an edge of the disc which is as smooth as is desired.

SUMMARY OF THE INVENTION

An apparatus for removing flash from a recorded disc includes a cutter blade which is mounted for movement toward and away from the edge of the disc. The cutter blade is first moved against the edge of the rotating disc to remove a major portion of the flash. The cutter blade is then moved slowly against the edge of the disc to the desired diameter of the disc to remove the remaining portion of the flash.

DETAILED DESCRIPTION OF THE PREFERRED EMBODIMENTS

Figure 1:
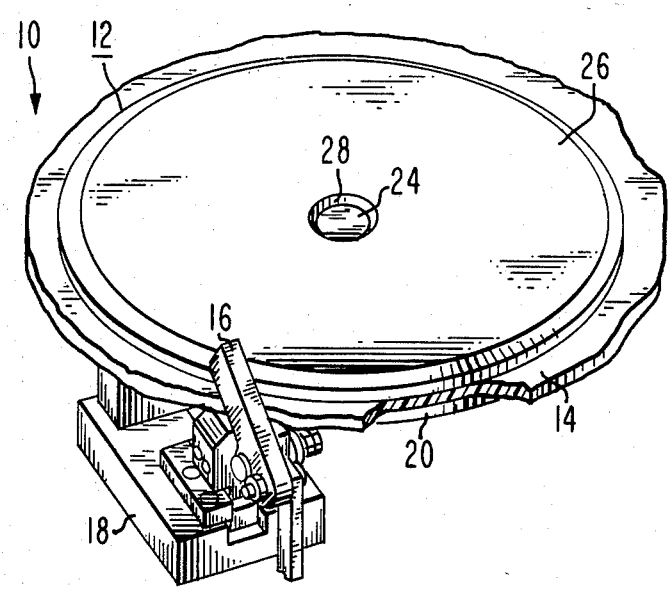
FIG. 1 is a perspective view of a deflashing apparatus incorporating the knife of the present invention.

Referring to FIG. 1, the deflashing apparatus which incorporates the present invention is generally designated as 10. The deflashing apparatus 10 includes a turntable 12 for supporting the molded disc 14 to be trimmed, a scissors type knife 16, and a knife support 18. The knife support 18 is adapted to move the knife toward and away from the turntable 12.

The turntable 12 includes a circular support plate 20 having a flat top surface and mounted at its center on a rotary shaft (not shown). The support plate 20 has a circular hub 24 projecting from the center of its top surface which is adapted to extend through the hole in the recorded disc 14. A circular top plate 26 is seated on the recorded disc 14 and has a center hole 28 therethrough which receives the hub 24. The top plate 26 is supported by a mechanism, not shown, which will move the top plate 26 toward and away from the support plate 20 to permit an untrimmed disc 14 to be placed therebetween and permit its removal after the disc 14 is trimmed.

Figure 2:
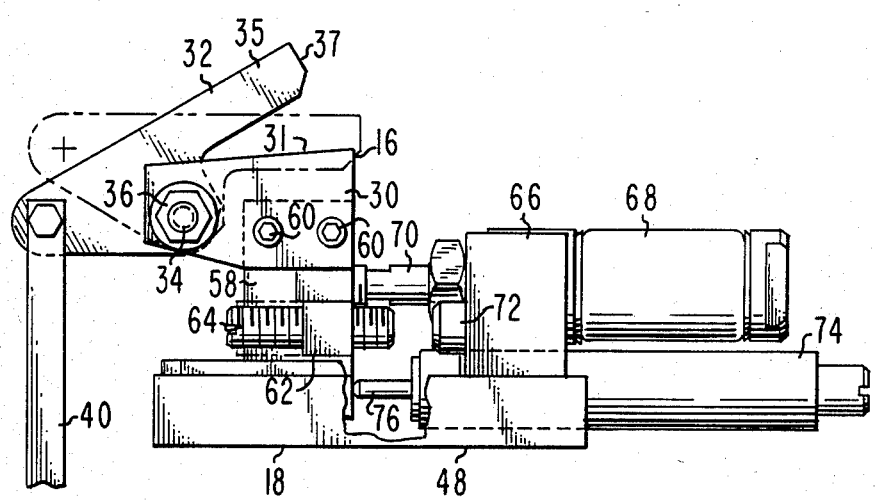
FIG. 2 is a side view of the knife of the present invention.
Figure 3:
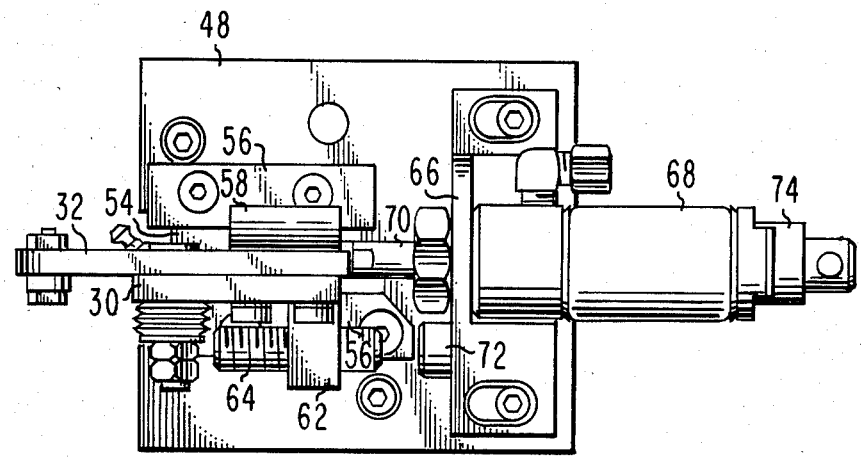
FIG. 3 is a top view of the knife of the present invention.
Figure 4:
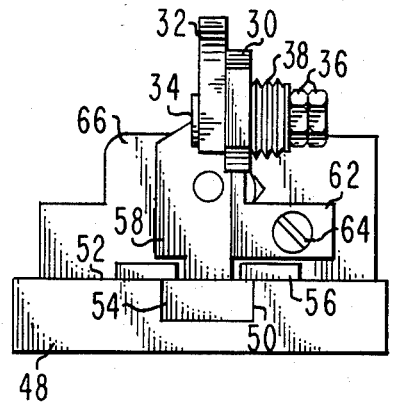
FIG. 4 is an end view of the knife of the present invention.

As shown in FIG. 2, the knife 16 has a bottom blade 30 and a top blade 32 which are in side-by-side relation. The blades 30 and 32 are pivotally mounted together by a bolt 34 which extends through the top blade 32 between the ends of the top blades and through the back end of the bottom blade 30. As shown in FIG. 4, nuts 36 are threaded on the end of the bolt 34 and spring washers 38 surround the bolt 34 between the nuts 36 and the surface of the bottom blade 30. The top blade 32 extends beyond the back end of the bottom blade 30, and actuating rod 40 is pivotally secured to the back end of the top blade 32. The actuating rod 40 is connected to means for selectively moving the rod up and down vertically, such as a piston rod of an air cylinder (not shown). This allows selected pivotation of the top blade 32 with respect to the bottom blade 30 so as to open and close the scissors knife 16.

Figure 5:
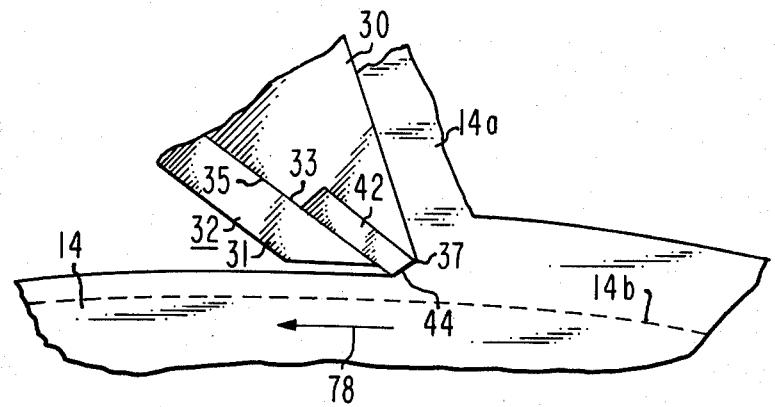
FIG. 5 is an enlarged view of the tip of the knife, illustrating the operation of the tip of the knife.

The cutting edge of the bottom blade 30 is the edge between the top surface 31 of the bottom blade 30 and the surface 33 adjacent the top blade 32 at the front end of the bottom blade 30. The top blade 32 has a sharp cutting edge along the bottom edge of the surface 35 adjacent to the bottom blade 30 and the front end 37 of the top blade 32. In addition, as shown in FIG. 5, an insert 42 of a hard material, such as a carbide, is secured in a recess in the surface 35 of the top blade 32 adjacent the bottom blade 30 at the front end 37 of the top blade 32. The insert 42 has a front cutting surface 44 with negative rake angle, i.e., the angle between the cutting surface 44 and the surface 35 of the top blade 32 is greater than 90°. A rake angle of about 8° is preferred so that the angle between the cutting surface 44 and the surface 35 is about 98°.

The knife support 18 includes a rectangular base plate 48 having a rectangular groove 50 in its top surface 52. The groove 50 extends along the top surface 52 from one end of the base plate 48 to the other. A rectangular slide block 54 is within the groove 50 and is of the same cross sectional area as the groove 50. A pair of retainer strips 56 are mounted on the top surface 52 of the base plate 48 adjacent the sides of the groove 50 at the back end of the base plate 48. The retainer strips 56 project partly over the slide block 54 so as to retain the slide block 54 within the groove 50 but allow the slide block 54 to move longitudinally within the groove 50. A mounting block 58 is secured to the slide block 54 and projects upwardly therefrom between the retainer strips 56. The bottom blade 30 of the scissors knife 16 is secured to one side of the mounting block 58 by screws 60 as shown in FIG. 2. The bottom blade 30 is positioned on the mounting block 58 such that the bottom blade 30 projects beyond the top and back end of the mounting block 58. As shown in FIG. 4, an arm 62 is secured to and projects from the side of the mounting block 58. A stop pin 64 is threaded through the arm 62 and is parallel to the line of movement of the slide block 54 in the groove 50. The stop pin 64 projects beyond the front end of the mounting block 58.

A support block 66 is mounted across the top surface 52 of the base plate 48 adjacent to the front end of the base plate. A pneumatic cylinder 68 is mounted on the support block 66 in alignment with the mounting block 58 and parallel to the groove 50. The shaft 70 of the pneumatic cylinder 68 extends toward and is secured to the front end of the mounting block 58. Thus, actuation of the pneumatic cylinder 68 will move the mounting block 58 toward and away from the pneumatic cylinder 68. A stop pad 72 is mounted on the support block 66 opposite and in alignment with the stop pin 64. The stop pin 64 is adapted to engage the stop pad 72 to limit the movement of the mounting block 58 toward the pneumatic cylinder 68. A hydraulic dashpot 74 is mounted in the groove 50 beneath the pneumatic cylinder 68. The piston rod 76 of the dashpot 74 extends toward and engages the front end of the slide block 54 as shown in FIG. 2. Thus, the dashpot 74 controls the speed that the pneumatic cylinder 68 moves the mounting block 58 toward the pneumatic cylinder 68.

The knife support 18 is mounted on a suitable support, not shown, adjacent the turntable 12 with the knife support 18 being beneath the circular plate 20 and the front ends of the blades 30 and 32 facing toward the edge of the circular plate 20. The cutting edge of the bottom blade 30 is positioned slightly above the top surface of the circular plate 20 and the blades 30 and 32 are at an angle of about 22° with respect to the tangent of the circular plate 20. The front end of the top blade 32 is positioned so that the direction of rotation of the circular plate 20, indicated by arrow 78 in FIG. 5, moves the disc 14 against the front cutting surface 44 of the insert 42 of the top blade 32 which has the negative rake angle. The front end 37 of the top blade 32 is spaced from the circular plate 20 a distance such that when the pneumatic cylinder 68 is operated to move the mounting block 58, and thus the knife 16, to a position furthest from the pneumatic cylinder 68, the cutting surface 44 is spaced at a short distance, for example 0.080 inch, from the desired diameter of the disc 14.

In the operation of the deflashing apparatus 10, the pneumatic cylinder 68 is actuated to move the knife 16 to its position furthest from the turntable 12, and the actuating rod 40 is pulled downwardly to open the scissors knife 16 by pivoting the top blade 32 away from the bottom blade 30. The top plate 26 of the turntable 12 is lifted from the circular plate 20 and a freshly molded disc 14 is placed on the circular plate 20. The top plate 26 is then lowered onto the disc 14 to clamp the disc between the top plate 26 and the circular plate 20, so that the flash of the disc 14 projects beyond the periphery of the circular plate 20. When the freshly molded disc 14 is placed on the circular plate 20, the bark portion of the flash will extend over the bottom blade 30. The bark portion of the flash is the major portion of the flash. For example, the bark portion may be the center 0.25 inch of the flash with the remaining portion of the flash being about 0.080 inch in radius. The actuating rod 40 is then moved upwardly to close the knife 16 by pivoting the top blade 32 downwardly toward the bottom blade 30. This causes the top blade 32 to cut through the bark portion 14a of the flash. The turntable 12 is then rotated in the direction of the arrow 78 causing the top blade 32 to remove a major portion of the flash, the bark portion 14a, as shown in FIG. 5. After the disc 14 has rotated for at least one revolution so as to remove the bark portion 14a of the flash completely from around the edge of the disc, the pneumatic cylinder 68 is actuated to move the end of the top blade 32 slowly inwardly against the edge of the disc 14. The dashpot 74 is adjusted to control the inward movement of the top blade 32 so that it removes only a small amount of the flash, e.g., about 0.010 inch, during each revolution of the disc 14. Thus, during each revolution of the disc 14, the top blade 26 will remove a small amount from the edge of the disc 14 until the stop pin 64 engages the stop pad 72 to stop the inward movement of the blade at the desired diameter of the disc 14 as indicated by dash line 14b in FIG. 5. By providing the top blade 32 with a cutting edge having a negative rake angle, the tool tends to push the work away from the cutting surface so as to provide a smooth cut surface and provide for longer tool life. Thus, the deflashing apparatus 10 of the present invention, which first removes a major portion of the flash and then slowly removes the remaining portion of the flash, in addition to having a negative rake angle cutting surface, provides for accurate control for the diameter of the disc 14 without chipping the edge of the disc, thereby providing the completely deflashed disc with a smooth edge.

When the stop pin 64 engages the stop pad 72, the pneumatic cylinder 68 is actuated to move the knife 16 away from the edge of the deflashed disc 14, and the actuating rod 40 is moved downwardly to open the knife 16. The top plate 26 of the turntable 12 is moved away from the circular plate 20 to permit removal of the deflashed disc 14 and the insertion of a newly molded disc. Thus, the deflashing apparatus 10 of the present invention permits the deflashing of a newly molded disc 14 to achieve a disc having a desired control diameter with a smooth outer edge.

We claim:

1. A method of removing flash from a molded disc comprising the steps of:
   bringing a knife against the flash across a major portion of the flash,
   rotating the disc about its center to cut away the major portion of the flash, and then
   without stopping the rotation of the disc slowly moving a cutting edge of the knife along a line having a component radially inwardly of the disc to a point at the desired radius of the disc to remove the remaining portion of the flash.

2. A method in accordance with claim 1 in which the major portion of the flash is cut away by bringing the knife against the flash to cut through the flash along a line substantially radially of the disc and then rotating the disc against the knife to remove the major portion of the flash during one revolution of the disc.

3. A method in accordance with claim 2 in which the remaining portion of the flash is removed by moving the cutting edge of the knife against the edge of the disc at a speed such that only a portion of the remaining portion of the flash is removed during each revolution or rotation of the disc.

4. A method in accordance with claim 2 in which the major portion of the flash is cut through by an edge of the knife which is at an angle of approximately 22° with respect to a tangential line of the edge of the disc and is removed by a surface at the end of the knife having a negative rake angle.

5. An apparatus for removing flash from a molded disc comprising:
   means for supporting the disc for rotation about the center of the disc,
   a knife mounted adjacent the means for supporting the disc,
   means for moving said knife across a portion of the flash of a disc so as to cut through said portion of the disc, and
   means for moving the knife inwardly along a line having a component radially inwardly of the disc.

6. Apparatus in accordance with claim 5 in which the knife is a scissors knife having a pair of blades pivotally connected together and means for moving one of the blades with respect to the other so as to open and close the knife.

7. Apparatus in accordance with claim 6 in which the means for moving the knife inwardly of the disc includes a base plate, a mounted block slidably supported on said base plate with the knife being mounted on the mounting block and means for selectively sliding the mounting block on the base plate.

8. Apparatus in accordance with claim 7 in which one blade of the knife is fixedly secured to the mounting block and the other blade is pivotally mounted on the one blade, said blades having cooperating cutting edges to cut through the major portion of the flash of the disc.

9. Apparatus in accordance with claim 8 in which the other blade also has a cutting surface at its front end having a negative rake angle.

10. Apparatus in accordance with claim 9 in which the front end of the other blade has a rake angle of about 8°.

11. Apparatus in accordance with claim 9 in which said other blade has an insert of a hard material at its front end with the insert providing the front end cutting surface.

12. Apparatus in accordance with claim 9 in which the blades of the knife are mounted at an angle of about 22° with respect to a tangent of the edge of the disc.

13. Apparatus in accordance with claim 7 in which the means for sliding the mounting block includes a pneumatic cylinder mounted on the base plate and having a piston rod connected to the mounting block.

14. Apparatus in accordance with claim 13 including a dashpot engaging the mounting block for controlling the speed of movement of the mounting block when it is moved inwardly towards the disc.

15. Apparatus in accordance with claim 14 including adjustable stop means for controlling the distance that the pneumatic cylinder can move the mounting block toward the disc.

* * * * *